United States Patent
Zortman

(10) Patent No.: US 9,488,854 B1
(45) Date of Patent: Nov. 8, 2016

(54) HIGH-SPEED OPTICAL PHASE-SHIFTING APPARATUS

(71) Applicant: Sandia Corporation, Albuquerque, NM (US)

(72) Inventor: William A. Zortman, Corrales, NM (US)

(73) Assignee: Sandia Corporation, Albuquerque, NM (US)

( * ) Notice: Subject to any disclaimer, the term of this patent is extended or adjusted under 35 U.S.C. 154(b) by 637 days.

(21) Appl. No.: 13/861,069

(22) Filed: Apr. 11, 2013

Related U.S. Application Data

(60) Provisional application No. 61/622,956, filed on Apr. 11, 2012.

(51) Int. Cl.
*G02F 1/00* (2006.01)
*G02F 1/025* (2006.01)
*G02B 6/12* (2006.01)

(52) U.S. Cl.
CPC ............... *G02F 1/025* (2013.01); *G02B 6/12* (2013.01); *G02B 2006/12159* (2013.01)

(58) Field of Classification Search
CPC ............ G02F 2001/212; G02F 2203/50; G02F 2201/20; G02F 2201/16; G02F 2203/20; H04B 10/50577; H04B 10/5051
USPC ........ 398/183, 188–189, 195, 198, 161, 200; 385/3, 24, 39
See application file for complete search history.

(56) References Cited

U.S. PATENT DOCUMENTS

| | | | |
|---|---|---|---|
| 6,236,488 B1* | 5/2001 | Shimizu et al. | 398/198 |
| 6,744,992 B2* | 6/2004 | Bergano | H04B 10/532 398/152 |
| 8,787,708 B2* | 7/2014 | Doerr | 385/3 |
| 8,903,253 B2* | 12/2014 | Secondini et al. | 398/186 |
| 2002/0191285 A1* | 12/2002 | Damask | G02F 1/0136 359/484.01 |
| 2003/0002118 A1* | 1/2003 | Givehchi | 359/181 |
| 2007/0046952 A1* | 3/2007 | Kikuchi | G01J 11/00 356/512 |
| 2007/0211984 A1* | 9/2007 | Gopinath | G02F 1/3132 385/3 |
| 2010/0014874 A1* | 1/2010 | Kawanishi et al. | 398/187 |
| 2010/0054756 A1* | 3/2010 | Nishihara et al. | 398/185 |

* cited by examiner

*Primary Examiner* — Ellen Kim
(74) *Attorney, Agent, or Firm* — Martin I. Finston

(57) ABSTRACT

An optical phase shifter includes an optical waveguide, a plurality of partial phase shifting elements arranged sequentially, and control circuitry electrically coupled to the partial phase shifting elements. The control circuitry is adapted to provide an activating signal to each of the N partial phase shifting elements such that the signal is delayed by a clock cycle between adjacent partial phase shifting elements in the sequence. The transit time for a guided optical pulse train between the input edges of consecutive partial phase shifting elements in the sequence is arranged to be equal to a clock cycle, thereby enabling pipelined processing of the optical pulses.

10 Claims, 1 Drawing Sheet

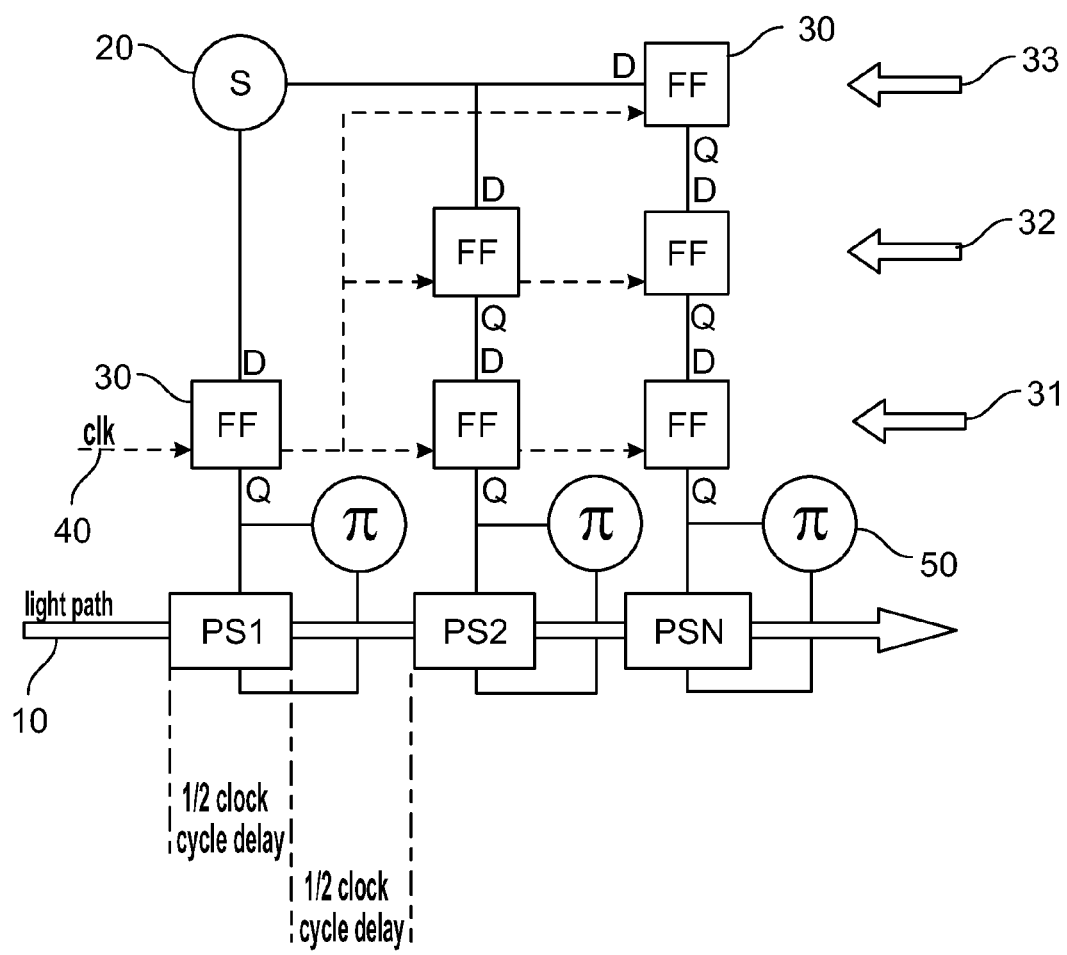

HIGH-SPEED OPTICAL PHASE-SHIFTING APPARATUS

CROSS-REFERENCE TO RELATED APPLICATIONS

This application claims the benefit of U.S. Provisional Application Ser. No. 61/622,956 entitled HIGH-SPEED PHOTONIC MODULATOR DESIGNS and filed on Apr. 11, 2012.

STATEMENT OF GOVERNMENT INTEREST

This invention was developed under Contract DE-AC04-94AL85000 between Sandia Corporation and the U.S. Department of Energy. The U.S. Government has certain rights in this invention.

TECHNICAL FIELD

The present invention is directed generally to photonic devices, and more particularly to a high-speed phase shifter applicable to phase modulation for coherent communication systems and amplitude modulation for on-off keyed systems.

BACKGROUND OF THE INVENTION

Phase shifting of light in coherent optical communications has various uses, including phase coding of optical pulses. Phase shifting is conventionally performed by lithium niobate phase shifters. Lithium niobate phase shifters are advantageous not least because they offer high speed operation and hence are useful for applications such as 100 Gb ethernet.

However, such devices typically require several volts of electric potential and occupy relatively large substrate areas. These characteristics are disadvantageous at least in the context of integrated CMOS devices because CMOS platforms are typically limited to 3.3V and the footprints of lithium niobate devices generally exceed what is acceptable for chip-scale integration. Moreover, lithium niobate is not compatible with silicon manufacturing.

Phase-shifters have in fact been implemented in silicon with speeds approaching those of lithium niobate phase shifters. However, such devices rely on the electro-optic effect, which in silicon is too weak to shift the phase by a useful amount over a short distance. Instead, the transit time of the optical pulse through the active length of the phase shifter may reach a significant fraction of the input radiofrequency pulse period. Hence, to avoid severely limiting the bandwidth of the device, it is desirable to apply the input signal via a travelling wave electrode.

Although useful, travelling wave electrodes also suffer a disadvantage. That is, a travelling wave electrode must be terminated to match the impedance of the driving circuit. The terminating resistor (or other element) increases the power dissipation of the device.

Hence, there remains a need for phase-shifting devices that offer speeds approaching those of lithium niobate phase shifters, are compatible with CMOS chip integration, and have less power dissipation than existing devices.

SUMMARY OF THE INVENTION

An exemplary embodiment of the present invention is an optical phase shifter designed to provide a phase shift $\phi$ for light having a wavelength within an operating range. The optical phase shifter includes: an optical waveguide; N partial phase shifting elements, where N is an integer, coupled to the optical waveguide in a sequence; and control circuitry electrically coupled to the N partial phase shifting elements.

The total phase shift length of the N partial phase shifting elements is selected to provide the light with a total phase shift equal to $\phi$ when an operating voltage V is applied. The control circuitry is adapted to provide a signal having an amplitude equal to V to each of the N partial phase shifting elements such that the signal is delayed by a clock cycle $t_{clock}$ between adjacent partial phase shifting elements in the sequence. Each partial phase shifter has an input edge. The N partial phase shifting elements are arranged along the length of the optical waveguide such that the transit time for the light between the input edges of consecutive partial phase shifting elements in the sequence is equal to $t_{clock}$. We refer to our design as a "bang-bang" optical phase shifter because each segment of the phase shifter fires based on a digital electrical delay similar in concept to a bang bang phase locked loop.

It is to be understood that both the foregoing general description and the following detailed description are exemplary, but are not restrictive, of the invention.

BRIEF DESCRIPTION OF THE DRAWING

FIG. 1 is a schematic diagram of the inventive optical phase-shifting apparatus in one embodiment.

DETAILED DESCRIPTION

As seen in FIG. 1, an exemplary embodiment of the present invention includes a serial arrangement of N phase shifters PS1, PS2, . . . , PSN that operate in forward or reverse bias using an electrooptic effect. For example, one well-known type of phase shifter is a pn-junction device that operates by increasing or depleting the carrier population in an intrinsic silicon waveguiding region by respectively forward or reverse biasing adjacent p and n type regions. Other modulation mechanisms, such as the Franz-Keldysh effect, are known and may be utilized in alternate embodiments.

The light, typically a train of optical pulses, that is to be modulated by imposition of a phase shift thereon traverses the sequence of phase shifters on light path 10. Within each phase shifter, a silicon or other electrooptical medium is enclosed between a pair of electrodes which, although not shown in the FIGURE, would be situated at respectively the top and bottom of each phase shifter as depicted in the FIGURE. The electrooptic effect is produced by application of a voltage between each pair of electrodes. The applied voltage is typically an electrical signal, shown in the FIGURE as originating from signal source 20, that varies at radio frequency in accordance with a data stream that is to be modulated onto the optical pulse train.

As those skilled in the art will appreciate, a device that relies on one long, contiguous phase shifter is generally limited in bandwidth when the identical electrical signal is simultaneously applied along the full length of the phase shifter, because over the length of time it takes for an optical wave to transit the length of the phase shifter, the phase of the optical wave can fall out of step with the phase of the electrical signal. The conventional solution to this problem is a traveling wave design in which the electrical signal propagates along the optical path so as to remain matched in phase to the optical wave. As we have noted above, however, traveling wave designs may have disadvantageous levels of power dissipation.

As explained in detail below, we have developed an alternative to the traveling wave design that may be operable at similar, or even greater, speeds without suffering the same disadvantageous level of power dissipation.

With further reference to FIG. 1, it will be seen that in our design, the series of N partial phase shifters are concatenated so that the partial phase shift applied to the optical signal in each partial phase shifter is additive to partial phase shifts applied in the previous phase shifters through which the optical signal has passed. Instead of applying an analog electrical signal to the partial phase shifters, we apply a digital electrical input signal to each of the partial phase shifters. This applied signal corresponds, e.g., to the Q output of a flip-flop 30 as shown in the FIGURE. The logical output voltage level may provide an adequate bias, without further conditioning, to drive the partial phase shifter. Alternatively, the logical output voltage may first be input to a driver circuit (not shown) that conditions the electrical signal suitably for driving the partial phase shifter.

In this context, the flop-flops are serving as delay elements that match the phase of the optical signal to the phase of the electrical signal by delaying the electrical signal just enough, between successive partial phase shifters, to match the propagation delay of the optical signal from the input edge of one partial phase shifter to the input edge of the next partial phase shifter.

More specifically, the flip-flops are arranged in N ranks. For example, the FIGURE shows an arrangement in which N=3. Accordingly, the flip-flops are arranged in three ranks 31, 32, 33 respectively. The flip-flops are cascaded such that only a first-rank flip-flop delays the input to the first partial phase shifter, a first-rank cascaded with a second-rank flip-flop delay the input to the second partial phase shifter, and so forth. N cascaded flip-flops, i.e. one of each rank, delay the input to the N'th partial phase shifter. In the arrangement illustrated in the FIGURE, the flip-flops are cascaded by applying the Q output of one flip-flop to the D input of the next flip-flop. It will be understood that similar principles may be applied using inverters or any of various other delay elements as alternatives to flip-flops, and thus that the use of flip-flops in the present context is illustrative only, and is not meant to be limiting.

It will also be seen in the FIGURE that a clock signal 40 is applied to the clock input of each flip-flop. In some possible implementations, all of the partial phase shifters have the same optical length, all flip-flops have the same timing, i.e., they all see the same clock period, and each flip-flop increases the signal clock delay by one clock period. As indicated in the FIGURE, half of the clock period equals the optical transit time through a partial phase shifter, and the other half of the clock period accounts for the optical transit time between phase shifters.

Such an arrangement may increase the frequency of operation of the bang-bang phase shifter by as much as N times relative to a conventional traveling wave phase shifter. This can be understood by considering that the optical pulse train is subjected to pipeline processing. That is, except during a brief initialization period, N optical pulses are simultaneously processed within an active length that is at worst only slightly longer than the active length of a conventional traveling-wave phase shifter. N clock cycles of the bang-bang phase shifter will therefore correspond to one transit time through a traveling-wave phase shifter, or only a little bit longer. However, at the beginning of each clock cycle, one optical pulse will be output from the N'th partial phase shifter with a total phase shift φ that is the sum of all N partial phase shifts.

In some possible implementations, as shown in the FIGURE, the first-rank flip-flops are used to drive respective differential circuits, which can make it possible to operate the device at reduced voltage. More specifically, in differential drive the signal input to one side of the optical path is delayed by one-half a clock cycle, as schematically indicated in the FIGURE by π-radian delay element 50. More information about differential drive may be found, e.g., in U.S. patent application Ser. No. 13/770,501, filed by Anthony L. Lentine et al. on Feb. 19, 2013 under the title, "Low-Voltage Differentially-Signaled Modulators" and commonly assigned herewith, the entirety of which is hereby incorporated by reference herein.

Very briefly, differential signaling is a method that can be used to double the driving potential from a given voltage supply. If, for example, the Vdd bar on a CMOS device provides 1V that is available to drive an optical device, then a designer can designate two connections, A and B, and bias them at 0.5V. Initially, then, A is at 0.5V and B is at 0.5V. Assume that a signal value of "one" is sent at event 1, and a signal value of "zero" is then sent at event 2. In our example, this takes place as follows: At event 1 the signal begins and line A goes to 1V and line B goes to 0V for the pulse duration to create the "one.". At event 2, line A goes to 0V while line B goes to 1V to create the "zero". During event 1 the diode is biased at +1V and during event 2 the diode is biased at −1V because the applied polarities have been reversed. Hence, the total swing on the device is 2V. In effect, by using a supply of 1V in this manner we have created a signal of 2V on the device. The actual middle voltage in the system is 0.5V, but the middle voltage that the device sees is 0V. This shows that the system middle voltage can be set arbitrarily, whereas the device will always see a middle voltage of 0V. This also implies that any external noise that affects both line A and line B will not affect the device, because that noise behaves, in this regard, just like a bias disturbance.

Those skilled in the art will appreciate that the example described above is subject to numerous variations and alternative embodiments that may be achieved without deviating from the scope and spirit of the present invention. For example, there may be implementations in which some or all of the partial phase shifters are of different optical lengths, which are varied depending, e.g., on the respective amount of phase shift desired in each partial phase shifter. In implementations, such delays may be compensated, at least in part, by dc voltage-controlled variable optical delay lines.

Moreover, differences in the total optical delay (i.e. the sum of the transit time across a given partial phase shifter and the transit time to the next partial phase shifter) between different pairs of partial phase shifters may be accommodated, in implementations that include a clock mixing circuit to provide different clock cycles according to the different optical delays. More specifically, a clock mixing circuit can take a set of input clocks, e.g. at frequencies of 1 GHz, 2 GHz and 5 GHz, sample them at varying phases, and then mix those phases back together using a phased locked loop (PLL) to create an arbitrary clock frequency and phase. A clock mixing circuit could also vary the duty cycle of the logical signal to compensate mismatches between, e.g., the MZM delay (i.e. the transit time in the partial phase shifter element) and intervening waveguide delay. In other implementations, the clock mixing circuit might be as simple as a clock input that has a multiplexer and access to an array of different individually selectable clocks.

By combining variable optical delays with variable (or selectable) clock cycles, it is possible to make a system in which both the optics and the electronics are reconfigurable. The generalized phase-matching condition that applies to implementations that permit non-uniform delays is that the optical transit time from the input of one phase shifter to the next needs to be exactly the time between two consecutive positive clock edges of the pertinent clock cycle.

As we noted above, phase shifting of light in coherent optical communications has various uses, including phase coding of optical pulses. One particular application for which we believe our bang-bang phase shifter is advantageous is in a Mach-Zehnder modulator. As is well known in the art, Mach-Zehnder modulators are useful for, among other things, producing amplitude-modulated optical signals by combining the output signals from two respective interferometer arms that are subjected to a controllable relative phase delay. Our bang-bang phase shifter is readily employed to produce phase delays in one arm, or in both arms, of a Mach-Zehnder modulator. Moreover, for advantageous reduction of operating voltages, our phase shifter can be implemented in a Mach-Zehnder modulator that uses differential drive and/or has arms that are unbalanced in phase.

What is claimed is:

1. Apparatus comprising an optical phase shifter arranged to operate on light that is confined and guided on a light path, the optical phase shifter comprising:
   an optical waveguide that defines at least a portion of the light path;
   a plurality of partial phase shifting elements coupled sequentially to the optical waveguide; and
   control circuitry arranged to provide, in response to an input signal, an electrical activating signal that is applied to each of the partial phase shifting elements after a respective delay that is additive to the respective delays of preceding partial phase shifting elements, if any, such that the activating signal is sequentially applied to the plurality of partial phase shifting elements with a respective total delay that increases from one partial phase shifting element to the next.

2. The apparatus of claim 1, wherein the control circuitry is arranged to activate the partial phase shifting elements in accordance with one or more clock cycles such that between each partial phase shifter and the next, the activating signal is delayed by one clock cycle.

3. The apparatus of claim 2, wherein the partial phase shifting elements are arranged along the optical waveguide such that an optical pulse propagating in the waveguide from an input edge of each partial phase shifting element to the input edge of the next partial phase shifting element is delayed by one clock cycle such that the optical pulses are phase-matched to the activating signal in each partial phase shifting element.

4. The apparatus of claim 3, arranged for pipeline processing of a plurality of optical pulses propagating in the optical waveguide.

5. The apparatus of claim 3, wherein the delay from each partial phase shifting element to the next partial phase shifting element is provided by a cascade of logical delay elements.

6. The apparatus of claim 5, wherein the logical delay elements are flip-flops.

7. The apparatus of claim 3, wherein the control circuitry is arranged to delay the activating signal by the same amount between each pair of successive partial delay elements in accordance with a single uniform clock cycle.

8. The apparatus of claim 3, wherein plural clock cycles are available and are selectable to correspond to different optical propagation delays between the input edges of different successive pairs of partial phase shifting elements.

9. The apparatus of claim 3, wherein the apparatus includes a Mach-Zehnder interferometer and the plurality of partial phase shifting elements is coupled to a portion of the optical waveguide that is incorporated in an arm of said interferometer.

10. The apparatus of claim 3, wherein each of the partial phase shifting elements is driven by a differential signal from the control circuitry.

* * * * *